United States Patent [19]

Smith et al.

[11] Patent Number: 5,294,310

[45] Date of Patent: Mar. 15, 1994

[54] SURFACTANT RECOVERY PROCESS

[75] Inventors: James D. B. Smith, Monroeville; Karl F. Schoch, Jr., Penn Hills; David C. Grant, Gibsonia, all of Pa.

[73] Assignee: Westinghouse Electric Corp., Pittsburgh, Pa.

[21] Appl. No.: 913,658

[22] Filed: Jul. 16, 1992

[51] Int. Cl.$^5$ ............................ C25F 5/00; C02F 1/46
[52] U.S. Cl. .................................. 204/130; 204/131; 204/149; 210/748
[58] Field of Search ................ 204/131, 149, 130; 210/748

[56] References Cited

U.S. PATENT DOCUMENTS

| | | | |
|---|---|---|---|
| 4,101,563 | 7/1978 | Landis | 260/425 |
| 4,765,901 | 8/1988 | Field | 210/603 |
| 4,844,745 | 7/1989 | Nash et al. | 134/42 |

FOREIGN PATENT DOCUMENTS 1162751  6/1985  U.S.S.R. .

OTHER PUBLICATIONS

Roy et al., Surfactant and Chelate-Induced Decontamination of Soil Materials, Environmental Institute for Waste Management Studies, Sep. 1988, Ill.
Ellis et al., Treatment of Contaminated Soils with Aqueous Surfactants; Hazardous Waste Engineering Research Laboratory, Nov. 1985.
Huang et al., Chem. Oxid. Proc. Inc. Symp., 1st Meeting 1991, pp. 239-253 abstract.
C. Phillips et al., Die Makromol, Chem., 169, pp. 177-189 (1973).
D. C. Phillips et al., J. Poly. Sci., Polymer Ed., 11, pp. 1867-1879 (1973).
J. D. B. Smith, et al., J. Poly. Sci., Polymer Chemistry Ed., 15, pp. 1555-1562 (1977).

*Primary Examiner*—Kathryn Gorggs
*Attorney, Agent, or Firm*—J. C. Valentine

[57] ABSTRACT

Surfactants in an aqueous solution is recovered from polychlorinated biphenyls and other aromatic organic compounds contaminating the solution. An electrical current is passed through a surfactant-containing aqueous solution contaminated with a colloidal dispersion of organic compounds at a voltage sufficient to electrochemically breakup the dispersion without polymerizing the surfactant. The contaminating aromatic organic compounds are then separated from the surfactant-containing aqueous solution. The separated surfactant-containing aqueous solution may be recirculated to a waste treatment process for cleaning additional organic compounds from contaminated equipment.

11 Claims, No Drawings

SURFACTANT RECOVERY PROCESS

BACKGROUND OF THE INVENTION

The present invention relates to a process for recovering surfactants in an aqueous solution from organic compounds contaminating the solution.

The present invention is particularly useful for recovering surfactants in aqueous waste streams generated by hazardous waste treatment processes. For example, organic compounds such as polychlorinated biphenyls (PCBs) and other phenyl compounds, non-vinyl compounds such as imidazole and pyrrole and other hazardous organic compounds must be removed from equipment contaminated therewith by hazardous waste treatments in accordance with governmental regulations before the equipment may be reused or scrapped. Such contaminated equipment is commonly cleaned by circulating a surfactant-containing (or detergent-containing) aqueous solution therethrough to wash the organic compounds from the contaminated areas and surfaces. Similar applications include the use of surfactants to remove contaminating organic compounds from soils, ashes and other solids. Surfactants employed to remove residual amounts of PCBs and like organic compounds include ethoxylated aromatics such as HYONIC NP-90 acid esters from Henkel Chemical Corporation or polyoxyalkylated fatty acid esters such as ADSEE 799 acid esters from Witco Chemical Co. Other surfactants may include carboxylic acid salts, sulfonic acid salts, sulfuric acid ester salts, phosphoric acid esters, long-chain amines, quaternary ammonium salts, polyoxyethylenated alkylphenols, polyoxyethylenated polyoxypropylene glycols, polyoxyethylenated mercaptans, polyoxyethylenated silicones and alkylpolyglycosides.

After cleaning the equipment, the contaminated surfactant-containing aqueous solutions must then be treated as hazardous wastes before they can be reused or discharged. Undesirably, in the present state of the art, aqueous solutions contaminated with PCBs and the like are treated by coprecipitating or by coadsorbing both the contaminants and the surfactants from the aqueous solutions. Thus, the surfactants are only used on a once through basis, and therefore, additional surfactants must be added to the solutions before they can be reused. Also, the additional volume and weight of the coprecipitates due to the coprecipitated surfactant or the contaminant loaded adsorbents results in additional material costs to remediate the contaminants.

U.S. Pat. No. 4,765,901 to Field discusses a method for purifying waste water wherein phenolic compounds are polymerized by an oxidative technique to form extractable polyphenols while avoiding their precipitation.

U.S. Pat. No. 4,844,745 to Nash et al. discloses a process employing the use of solvents to remove residual PCBs from electrical transformers and the like. Undesirably, this type of process does not separate the PCBs from the solvents, and the solvents must be disposed of as waste streams.

SUMMARY OF THE INVENTION

It is an object of the present invention to selectively remove contaminants such as PCBs and other phenyls, non-vinyls and other hazardous organic compounds from aqueous solutions so that surfactants in the aqueous solutions may be reused. It is a further object to minimize the total volume of these contaminants which must be remediated. It is another object of the invention to reduce the overall costs of aqueous waste treatment processes.

With these objects in view, the present invention resides in a process of recovering surfactants which do not polymerize at about 2 volts in an aqueous solution from a colloidal dispersion of organic compounds contaminating the solution. The contaminating organics may comprise phenyls, non-vinyls or other hazardous compounds. Thus, surfactants are separated from PCBs or other chlorinated phenyls in one practice of the invention. In another practice, the surfactants are separated from non-vinyls such as imidazole and pyrrole. Preferably, the surfactants are ethoxylated aromatics such as ethoxylated acid esters and polyoxyalkylated fatty acid esters. Advantageously, such surfactants will not polymerize at about 4 volts or less. In the improved process, an electrical current is passed through a surfactant-containing aqueous solution contaminated with organic compounds at a voltage sufficient to electrochemically breakup the dispersion without polymerizing the surfactants where at least some of the contaminants are polymerized by the current in a preferred practice of the invention. Substantially all of the contaminants may be polymerized. The contaminating compounds are then separated from the surfactant-containing aqueous solution. Preferably, the current is passed through the solution at a voltage difference of at least about 1.5 volts and, most preferably, between about 2.0 volts and about 4.0 volts. The contaminating organics preferably are separated from the solution by precipitation or by filtration. Advantageously, the surfactant-containing solution then may be recirculated with the addition of very little, if any, makeup surfactant or discharged. Also, the separated contaminants may be remediated at a more reasonable cost.

The present invention may be practiced in conventional flat plate cells or in continuous flow cell configurations which provide higher electrode surface area per unit volume than conventional cells. Such high efficiency configurations include fluidized beds, packed beds and pumped slurry cells.

DESCRIPTION OF THE PREFERRED EMBODIMENT

The recovery of surfactants in an aqueous solution from organic contaminants in accordance with the present invention was demonstrated in a bench scale test. Dilute aqueous solutions simulating the type of process waste solutions which are generated by industrial processes (as solutions, emulsions and slurries) for cleaning electrical transformers were made up containing about 1% by weight of NP-90 ethoxylated acid ester surfactant and about 1% by weight of o-dichlorobenzene (DCB). Advantageously, this surfactant does not polymerize at about 4 volts or less. Other suitable surfactants include polyoxylated fatty acid esters and like stable compounds. The test solution and a control solution were both initially observed to be cloudy and the control solution remained cloudy throughout the test.

The test solution was placed in a conventional electrochemical cell having platinum electrodes and an electrical current was passed therethrough. The solution was electrolyzed at 1.0 V, 1.5 V, and then 2.0 V for about 75 minutes as follows:

| Voltage Applied (V vs. SCE) | Total Time (minutes) | Charge Passed (d.c.mC) |
| --- | --- | --- |
| 0.0 | 15 | 0.470 |
| 0.5 | 32 | 1.819 |
| 1.0 | 45 | 9.847 |
| 1.5 | 60 | 51.42 |
| 2.0 | 75 | 123.48 |
| 2.5 | 90 | 119.58 |
| 3.0 | 105 | 125.23 |
| 3.5 | 120 | 123.88 |
| 4.0 | 135 | 121.51 |
|  | Total Charge = | 741.185 |

No changes were observed in the first 90 minutes of the test; and thereafter, there was electrolysis of the water with the production of gases.

At the end of the electrolysis, the aqueous solution had become clear and a white layer of DCB precipitated to the bottom of the cell. Such polymers may be precipitated by gravity or electrostatically. Also, those polymers which are not precipitated may be separated by filtration. The supernatant aqueous solution contained about 1% by weight surfactant after the test. Thus, the separated surfactant-containing solution was suitable for reuse to remove additional chlorinated phenyls, PCBs or other hazardous organic compounds from equipment, soils, ashes and the like contaminated therewith. Advantageously, non-vinyl compounds such as imidazole and pyrrole can be induced to polymerize and separate from an aqueous solution. The following art is hereby incorporated by reference for their discussions of electro-polymerization, electro-deposition and electro-filtration processes; J. D. B. Smith et al., J. Poly. Sci., Polymer Chem. Ed., 15, pp. 1555-62 (1977); D. C. Phillips et al., J. Poly. Sci., Polymer Ed., 11, pp. 1867-79 (1973); D. C. Phillips et al., Die Makromol Chem., 169, pp. 177-189 (1973); and U.S. Pat. No. 4,101,563 to Landis.

In addition to flat plate cells exemplified by the above test, continuous flow cell configurations providing much higher electrode surface area per unit volume may be employed. Such high efficiency cells include packed beds, fluidized beds and pumped slurry cells. See, in this regard, F. Goodridge, Chem. Process Eng., 49, 93 (1968) and 49, 100 (1968) which are hereby incorporated by this reference for their disclosures of such configurations. Fluidized bed and pumped slurry cells employ very fine current-conduction particles dispersed in the electrolyte solution. Advantageously, the fluid bed electrodes cells may have particularly large electrode surface areas per unit electrode/cell volume, low current per unit area of electrode (thereby favoring electro-organic reactions), continuous disturbance of the diffusion layer in the aqueous phase due to particle collisions and turbulence (and hence high rates of mass transfer to the surface of the particles) and absence of dendrite formations. See, in this regard, D. S. Flett, Chem. Ind., 100, (1971) and C. Oloman et al., Can. J. Chem., 53, 268, (1975), which are incorporated by this reference for their disclosures of such cells.

While a present preferred embodiment of the present invention has been shown and described, it is to be understood that the invention may be otherwise variously embodied within the scope of the following claims of invention.

We claim:

1. A process of recovering surfactants in an aqueous solution from organic compounds contaminating the solution, comprising the steps of:
    passing an electrical current through an aqueous solution containing a surfactant which doe snot polymerize at about 2 volts and contaminated with a colloidal dispersion of organic compounds at a voltage between about 2 and 4 volts to breakup the dispersion of contaminating organic compounds in the aqueous solution without polymerizing the surfactant; and
    separating the contaminating organic compounds from the surfactant-containing aqueous solution.

2. The process of claim 1, wherein at least some of the contaminating organic compounds are electrochemically polymerized by passing the current through the solution.

3. The process of claim 2, wherein the contaminating organic compound is electrochemically polymerized by passing a current through the solution at a voltage of 4.0 volts.

4. The process of claim 1, wherein the polymerized organic is separated from the aqueous solution containing the surfactant by precipitation.

5. The process of claim 1, wherein the contaminating organic compound is a polychlorinated biphenyl.

6. The process of claim 5, wherein the contaminating organic compound is dichlorobenzene.

7. The process of claim 1, wherein the contaminating organic compound is imidazole.

8. The process of claim 1, wherein the contaminating organic is pyrrole.

9. The process of claim 1 wherein the surfactant is an ethoxylated acid ester compound.

10. The process of claim 1, wherein the aqueous solution is contaminated with about 1%, by weight, of organic compounds and the separated surfactant-containing solution is visually clear.

11. The process of claim 10, wherein the solution contains about 1%, by weight, of surfactant.

* * * * *